F. W. WATERMAN.
AUTOMATIC DEVICE FOR OPERATING VALVES AND OTHER MECHANISMS.
APPLICATION FILED DEC. 26, 1907.
937,122.
Patented Oct. 19, 1909.
2 SHEETS—SHEET 2.
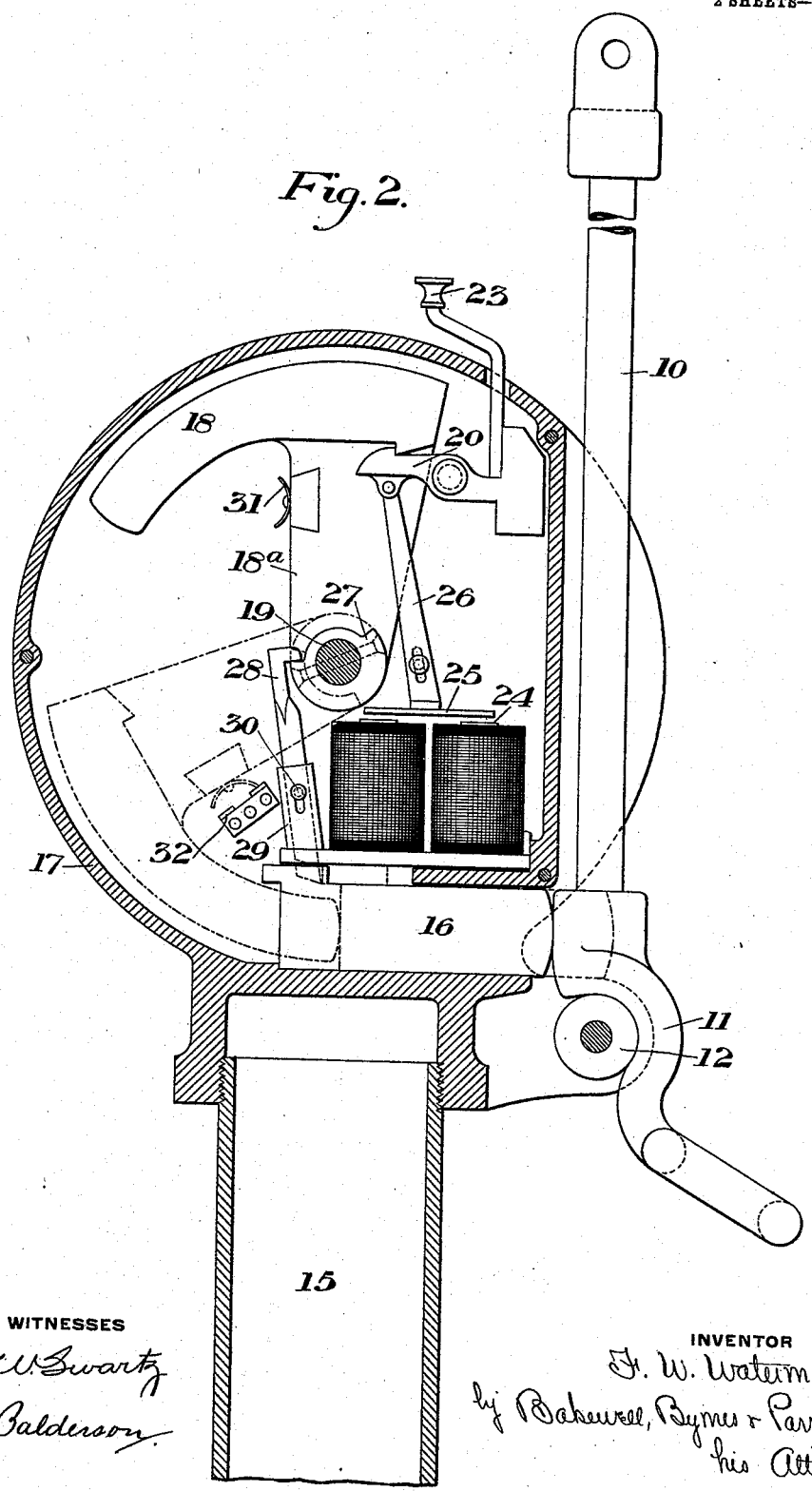

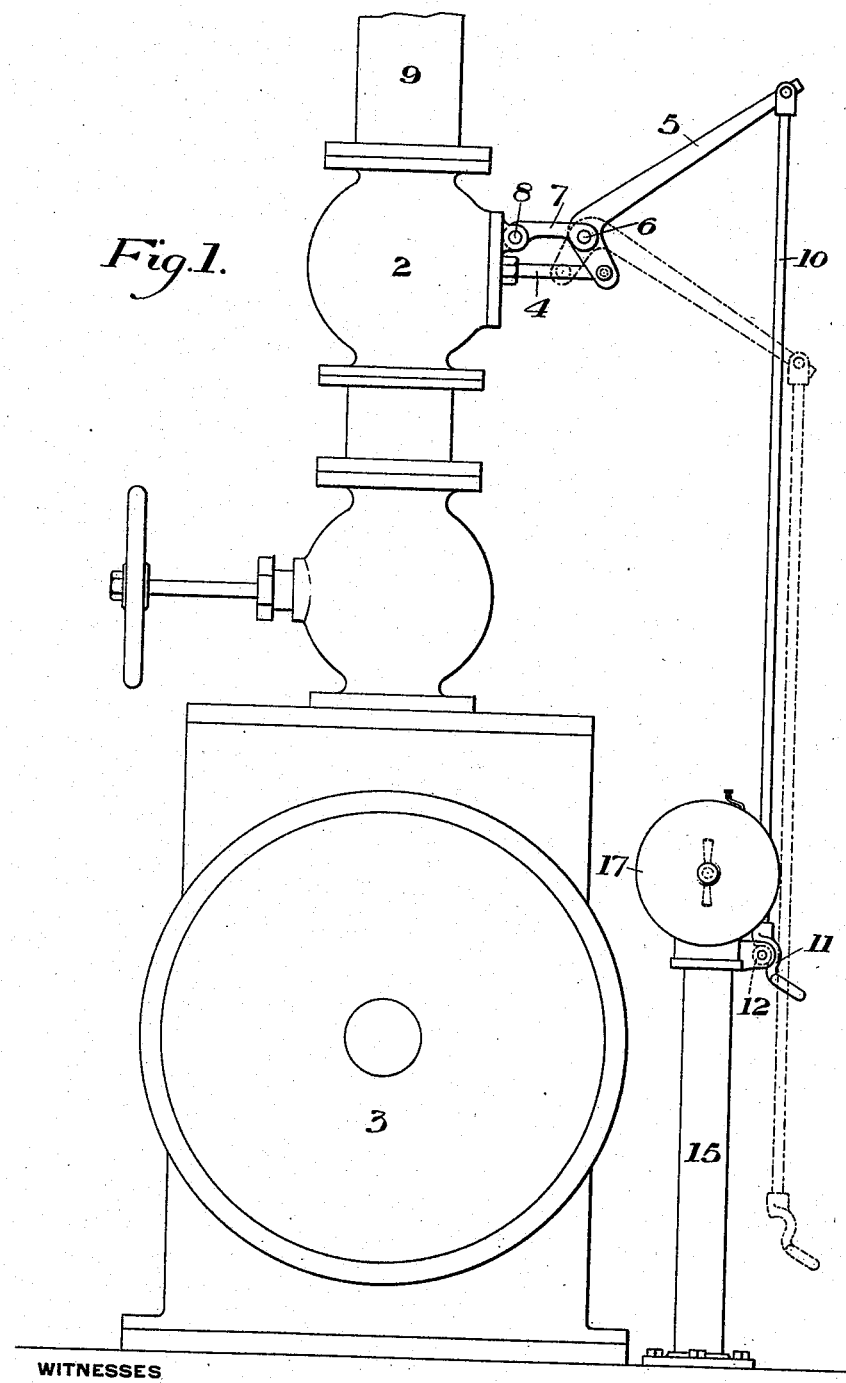

UNITED STATES PATENT OFFICE.

FRED WALTER WATERMAN, OF ELYRIA, OHIO.

AUTOMATIC DEVICE FOR OPERATING VALVES AND OTHER MECHANISMS.

937,122.  Specification of Letters Patent. Patented Oct. 19, 1909.

Application filed December 26, 1907. Serial No. 408,181.

*To all whom it may concern:*

Be it known that I, FRED WALTER WATERMAN, of Elyria, Lorain county, Ohio, have invented a new and useful Automatic Device for Operating Valves and other Mechanisms, of which the following is a full, clear, and exact description, reference being had to the accompanying drawings, forming part of this specification, in which:—

Figure 1 is a side elevation of one form of apparatus embodying my invention; and Fig. 2 is a vertical section of the same.

My invention has relation to an automatic device for operating valves and their mechanisms, and is more particularly designed as in improvement upon the device described and claimed in Patent No. 836,794, granted to Oscar Winter and myself on the 27th day of November, 1906.

The object of the present invention is to provide means for locking the trip mechanism in such a manner that it is positively necessary that the same shall be re-set before the engine or other controlling device can be again started.

The precise nature of the invention will be best understood by reference to the accompanying drawings which will now be described, it being premised, however, that various changes may be made by those skilled in the art without departing from the spirit and scope of my invention.

In these drawings, the numeral 2 indicates the admission or throttle valve of a steam engine 3, and 4 indicates the stem of the valve.

5 is a bent lever with its shorter arm loosely connected to the stem 4, and which is pivoted at 6 to a link 7, which is in turn pivoted to the valve casing at 8.

9 is the steam supply pipe controlled by the valve 2.

10 is a rod or link connected at its upper end to the longer arm of the lever 5 and having at its lower end the latch 11 arranged to be engaged with a detent or catch roller 12 for the purpose of normally holding the valve 2 in its open position, the lever 5, rod 10 and latch 11 being made of sufficient weight so that when the latch is disengaged from the detent, these parts will operate by their weight upon the valve stem 4 to automatically close the valve 2.

16 is a silding bolt, which is arranged in the lower part of an inclosing casing 17 sesured to a suitable support 15.

18 is a hammer carried by an arm 18ª, pivoted to a central shaft or pin 19, and which is normally held in the raised position shown in full lines in Fig. 2 by means of the pawl or detent device 20.

23 is the pull button, which projects through the casing in position to be operated from the outside, and which is connected to the pawl device 20.

24 is an electro-magnet, whose armature 25 is connected to the detent 20 by the connection 26.

The parts as so far described are substantially similar in all respects to the corresponding parts in the said patent, to which reference may be had for a fuller description, the parts herein having been given reference numerals similar to those of the patent.

The hub of the hammer 18 is provided with the cut-away segment 27 for engagement with a latch member 28, which is slidably mounted at its lower end portion in the sleeve 29, in which it is guided and restrained by a pin or screw 30.

31 is a buffer spring secured on the hammer arm 18ª and designed to contact with a fixed stop 32, when the hammer falls.

The operation is as follows:—When the device has operated to close the valve 2 in the manner described in the said patent, the sliding bolt 16 and the hammer 18 are in the positions indicated by the dotted lines in Fig. 2; and in these positions permit the sliding latch 28 to drop down behind the inner end of the sliding bolt 16. This prevents the sliding bolt from being moved backwardly, and consequently prevents replacement of the latch 11 on the detent 12. Therefore, the lever arm 10 cannot be moved back to its working position to open the valve 2. In order to start the engine, it is necessary therefore to move the hammer 18 back to its original position. This action, by the engagement of the hub of the hammer with the hooked upper end of the latch 28 withdraws said latch from behind the sliding bolt 16 and frees said bolt to permit it to be moved back to its operating position.

It will be seen that the present invention provides means of simple character which makes it absolutely impossible for the operator to start the engine without first putting every part in complete working order and ready for another operation.

It will be obvious that various other means may be employed for attaining this result within the scope of my invention, and that therefore I do not wish to restrict myself to the particular device which I have shown and described.

I claim:—

1. In mechanism of the character described, the combination with a normally open controlling member arranged to move from one position to another by gravity, latch means for normally holding the member against such movement, electro-magnetic holding means for controlling the release of the latch means to permit such movement under predetermined conditions, and means adapted positively to prevent restoration of the controlling member to its original position after operation until the latch and magnetic holding means have first been restored to their original positions; substantially as described.

2. In mechanism of the character described, the combination with a valve, lever connections arranged to operate said valve by their weight, a latch device for preventing such operation, a trip hammer arranged, when released, to fall and release said latch device by a hammer blow, means for effecting such release under predetermined conditions, and means whereby the valve cannot be restored to its former position until the hammer has been first restored to its original position; substantially as described.

3. In mechanism of the character described, the combination with a latch device, of a sliding bolt engaging said device, a pivoted drop hammer arranged to actuate said bolt by a direct hammer blow thereon, and means whereby the latch device cannot be restored to its original position after operation until the hammer has first been moved back to its original position; substantially as described.

4. In mechanism of the character described, the combination of a valve lever, a latch device for holding said lever in position to close the valve, a drop hammer arranged to release the latch device, and means whereby the lever cannot be again engaged with the latch device until the hammer has first been restored to its former position; substantially as described.

5. In mechanism of the character described, a normally open valve arranged to close by gravity, latch means for normally holding the gravity device against such movement, means for releasing said latch means comprising mechanism which is not directly connected to any other engine operating part, and means adapted to prevent operation of said latch means after said valve has been closed until the releasing means have first been restored to their former positions; substantially as described.

6. In mechanism of the character described, a latch, a pivoted counterweighted trip hammer arranged to release said latch, means for automatically controlling the release of the trip hammer, and means whereby the latch cannot be moved back to its engaging position until the trip hammer has first been moved back to its normal position; substantially as described.

7. In a device of the character described, the combination of a valve lever, a latch device arranged to engage said lever to hold the valve in open position, means for releasing the latch device under predetermined conditions to automatically effect the closing of the valve, and means adapted positively to prevent engagement of said lever with the latch device until the releasing means have been restored to their normal positions; substantially as described.

8. In a device of the character described, the combination of a valve lever, a latch therefor, a sliding member adapted to effect the disengagement of the latch and lever, a trip hammer for actuating the sliding member, and a second latch device for controlling the operation of the sliding member.

9. In a device of the character described, the combination of a valve lever, a latch device therefor, a sliding member adapted to effect the disengagement of the latch and lever, a trip hammer for actuating the sliding member, and a second latch device controlled by the movement of the hammer for controlling the operation of the sliding member; substantially as described.

10. In a device of the character described, a valve lever, a latch device therefor, a sliding member adapted to effect the disengagement of the latch and lever, a trip hammer adapted thus to actuate the sliding member, a gravity actuated latch device arranged to form a lock for the sliding member after it has been operated, and means whereby the return of the hammer to its original position withdraws the last-named latch device, substantially as described.

11. In a device of the character described, a valve lever, a latch therefor, a sliding member adapted to effect the disengagement of the latch and lever, a pivoted trip hammer adapted thus to actuate the sliding member, the hub of said hammer having a cut-away segment, and a gravity actuated member adapted to engage said sliding member to prevent its return after it has been operated, said gravity actuated member engaging the hub of said hammer, whereby the return of the latter to its original position withdraws said member from engagement with said sliding member.

12. In a device of the character described, a valve lever, a vertically disposed rod connected with said lever and adapted when free to close said valve, said rod being provided with a latch, a detent adapted to engage said latch to retain said rod in raised position, a sliding member adapted to effect the disengagement of the latch from the detent, a trip hammer for actuating the sliding member, and a second latch device for controlling the operation of the sliding member.

13. In a device of the character described, a valve lever, a vertically disposed rod connected with said lever and adapted when free to close said valve, said rod being provided with a latch, a detent adapted to engage said latch to retain said rod in raised position, a sliding member adapted to effect the disengagement of the latch from the detent, a trip hammer for actuating the sliding member, and a second latch device, controlled by the movement of the hammer, for controlling the operation of the sliding member.

14. In a device of the character described, a valve lever, a vertically disposed rod connected with said lever and adapted when free to close said valve, said rod being provided with a latch, a detent adapted to engage said latch to retain said rod in raised position, a sliding member adapted to effect the disengagement of the latch from the detent, a trip hammer adapted thus to actuate the sliding member, a gravity actuated latch device arranged to form a lock for the sliding member after it has been operated, and means whereby the return of the hammer to its original position withdraws the last-named latch device.

15. In a device of the character described, a valve lever, a vertically disposed rod connected with said lever and adapted when free to close said valve, said rod being provided with a latch, a detent adapted to engage said latch to retain said rod in raised position, a sliding member adapted to effect the disengagement of the latch from the detent, a pivoted trip hammer adapted thus to actuate the sliding member, the hub of said hammer having a cut-away segment, and a gravity actuated member adapted to engage said sliding member to prevent its return after it has been operated, said gravity actuated member engaging the hub of said hammer, whereby the return of the latter to its original position withdraws said member from engagement with said sliding member.

In testimony whereof, I have hereunto set my hand.

FRED WALTER WATERMAN.

Witnesses:
S. J. GEORGE,
M. L. HAGEMAN.